(12) United States Patent
Hagari et al.

(10) Patent No.: US 8,316,824 B2
(45) Date of Patent: Nov. 27, 2012

(54) CONTROL APPARATUS FOR INTERNAL COMBUSTION ENGINE

(75) Inventors: Hideki Hagari, Chiyoda-ku (JP);
Tomokazu Makino, Chiyoda-ku (JP);
Keitaro Ezumi, Aki-gun (JP);
Tomokuni Kusunoki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 262 days.

(21) Appl. No.: 12/906,753

(22) Filed: Oct. 18, 2010

(65) Prior Publication Data

US 2011/0093186 A1 Apr. 21, 2011

(30) Foreign Application Priority Data

Oct. 19, 2009 (JP) .................................. 2009-240076

(51) Int. Cl.
*F02P 5/00* (2006.01)

(52) U.S. Cl. .......... 123/406.29; 123/406.37; 123/406.47

(58) Field of Classification Search ............. 123/406.19, 123/406.23, 406.29, 406.37, 406.47, 299, 123/305; 701/111
See application file for complete search history.

(56) References Cited

U.S. PATENT DOCUMENTS

| | | | |
|---|---|---|---|
| 5,632,247 A | 5/1997 | Hashizume et al. | |
| 6,105,552 A | 8/2000 | Arisawa et al. | |
| 6,557,527 B2 | 5/2003 | Miyaji | |
| 7,165,517 B2 * | 1/2007 | Sugiyama et al. | 123/48 R |
| 7,478,623 B2 * | 1/2009 | Sugimoto | 123/406.29 |
| 7,779,813 B2 * | 8/2010 | Hahn | 123/406.47 |
| 2009/0150052 A1 * | 6/2009 | Kumano et al. | 701/103 |
| 2010/0174472 A1 * | 7/2010 | Matsushima et al. | 701/111 |
| 2011/0253108 A1 * | 10/2011 | Kawasaki | 123/48 R |
| 2012/0073543 A1 * | 3/2012 | Hagari et al. | 123/406.29 |

FOREIGN PATENT DOCUMENTS

| | | |
|---|---|---|
| JP | 61-187558 A | 8/1986 |
| JP | 11-093757 A | 4/1999 |
| JP | 11-247750 A | 9/1999 |
| JP | 3082634 B2 | 6/2000 |
| JP | 3093467 B2 | 7/2000 |
| JP | 2002-357156 A | 12/2002 |
| JP | 3937680 B2 | 4/2007 |

\* cited by examiner

*Primary Examiner* — John Kwon
(74) *Attorney, Agent, or Firm* — Sughrue Mion, PLLC (57) ABSTRACT

Control apparatus for an internal combustion engine including: a second knock detection unit for detecting occurrence of a second knock due to an effective compression ratio when ignition timing is on a retard side of a predetermined value in the case where a first knock is detected; a second knock suppression unit for suppressing the second knock when the second knock is detected; a first abnormal ignition detection means for detecting occurrence of first abnormal ignition due to the pre-ignition or the post-ignition when a knock intensity of the second knock is equal to or larger than a predetermined value; and a first abnormal ignition suppression unit for suppressing the first abnormal ignition by performing fuel control for the internal combustion engine when the first abnormal ignition is detected.

6 Claims, 9 Drawing Sheets

[1] : IGNITION TIMING AT WHICH EFFECTIVE
    COMPRESSION RATIO STARTS TO BE REDUCED
[2] : IGNITION TIMING AT WHICH RETARD IS AT LIMIT

CONTROL APPARATUS FOR INTERNAL COMBUSTION ENGINE

BACKGROUND OF THE INVENTION

1. Field of the Invention

The present invention relates to a control apparatus for an internal combustion engine, in particular, to a control apparatus for an internal combustion engine, which detects and suppresses abnormal combustion due to a knock, pre-ignition, and post-ignition, which occurs in the internal combustion engine.

2. Description of the Related Art

A method of detecting a knock, which corresponds to a kind of abnormal combustion occurring in an engine, by a vibration sensor is conventionally known. It is known that, if the knock occurs while the engine is in operation, vibrations in a specific frequency band occur according to a vibration mode of the engine or that of the knock. Therefore, the conventional knock detection is performed by measuring a vibration intensity of the specific frequency.

Specifically, an analog bandpass filter circuit is used to extract the specific frequency. A method of measuring the vibration intensity with a bandpass-filtered peak-hold value, which is obtained by inputting an output of the bandpass filter circuit to a peak-hold circuit, has been proposed (for example, see JP 2002-357156 A). A method of performing digital signal processing (for example, fast Fourier transform: FFT) to measure the vibration intensity with a spectral value of the specific frequency obtained by the digital signal processing has also been proposed (for example, see JP 3093467 B).

Besides the knock, pre-ignition and post-ignition are also known as the abnormal combustion occurring in the engine. The abnormal combustion due to the knock is as follows. First, after spark ignition with a spark plug, a flame propagates from the spark plug. At this time, an unburned air-fuel mixture (end gas), which is at a location distant from the spark plug, is pressed against a piston or a wall surface of a cylinder to be placed in a high-temperature and high-pressure state. As a result, when the end gas is self-ignited, a shock wave is generated. It is believed that the generation of the shock wave causes an excessively high in-cylinder pressure, a vibration of an engine block, and a metallic sound in the engine block.

The following two cases are considered as abnormal ignition called the pre-ignition or the post-ignition, for example. In the first case, the spark plug or a deposit present in the cylinder has an elevated temperature to be a heat source, leading to ignition (hereinafter, referred to as "heat-source self-ignition"). In the second case, when a compression ratio is high, a temperature and a pressure of the air-fuel mixture become high during a compression stroke to cause the self-ignition (hereinafter, referred to as "compression self-ignition"). Even in such a case, the excessively high in-cylinder pressure, the vibration of the engine block, and the metallic sound in the engine block are sometimes caused.

The abnormal ignition which is caused prior to normal spark ignition, is called the pre-ignition, whereas the abnormal ignition which is caused after the normal spark ignition, is called the post-ignition. The above-mentioned kinds of abnormal combustion are generally known (for example, see "University Lecture; Internal Combustion Engine (original title: Daigakukogi; Ninenkikan)" by Itsuro Kimura and Tadami Sakai, Maruzen, 1980, pp. 82 to 84, and "Lecture on Internal Combustion Engine (original title: Nainenkikan Kogi)", Vol. 1, by Fujio Nagao, 1980, pp. 216 to 223). If any one of the kinds of abnormal ignition occurs, the generation of an uncomfortable metallic sound or a fluctuation in engine output occurs. In an extreme case, the engine is damaged.

Even when the pre-ignition or the post-ignition (hereinafter, collectively referred to as the abnormal ignition) occurs, the vibrations of the engine sometimes occur at the same time. Therefore, a method of detecting the abnormal ignition by using the above-mentioned knock detection method has been proposed. As such a method, a method of determining the occurrence of the abnormal ignition based on a difference in time between ignition timing and a time of occurrence of the vibration is known (for example, see JP 3082634 B). Moreover, the following method of judging that the abnormal ignition has occurred is known. According to this method, when the vibrations due to the knock are not stopped within a predetermined period of time even by correcting the ignition timing to a retard side to suppress the knock after the detection of the knock, the vibrations due to the knock increase, or the vibrations due to the knock occur even after the ignition timing is retarded to most-retarded ignition timing, it is judged that the abnormal ignition has occurred (for example, see JP 3082634 B, JP 11-93757 A, and JP 11-247750 A).

As a method of suppressing the knock, a method of retarding the ignition timing is generally known (for example, see JP 2002-357156 A). In the case of the engine with a high compression ratio, it is known that a method of reducing an effective compression ratio after the ignition timing is retarded to the most-retarded position is also effective (for example, see JP 3937680 B). Further, as a method of suppressing the abnormal ignition, a method of reducing the amount of intake air, a method of increasing the amount of fuel injection (for example, see JP 3082634 B and JP 61-187558 A), and a method of fuel cut (for example, see JP 11-247750 A) are known.

However, the prior art has the following problems.

According to the conventional judgment method based on the difference in time between the ignition timing and the time of occurrence of the vibration, it is difficult to specify the time of occurrence of the vibration due to the abnormal ignition because the engine is always vibrated during the operation. Further, even if a position of a rise or peak of a relatively large vibration is detected as the time of occurrence of the vibration, each of the position of the rise and the position of the peak varies considerably. Therefore, the normal knock is frequently erroneously judged as the abnormal ignition.

Moreover, in the conventional judgment method of judging that the abnormal ignition has occurred when the vibrations due to the knock are not stopped within the predetermined period of time even after the ignition timing is corrected to the retard side, the vibrations due to the knock increase, or the vibrations due to the knock occur even after the ignition timing is retarded to the most-retarded ignition timing, there is a problem in that a torque is greatly lowered because the ignition timing is continuously retarded. Further, the judgment is made based on the continuous occurrence of the vibrations due to the knock over the predetermined period of time, and hence the above-mentioned conventional judgment method is also disadvantageous in that the uncomfortable vibrations or metallic sounds are continuously generated until the judgment of the abnormal ignition is made.

Figure 9:
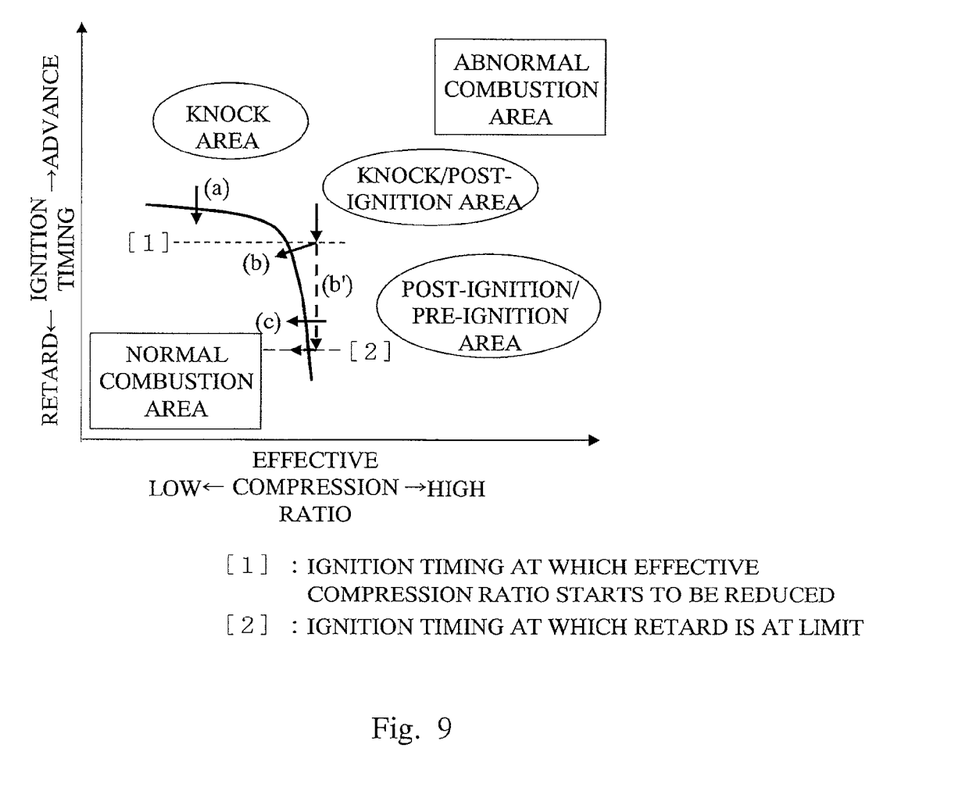
FIG. 9 is an explanatory view illustrating a relation between ignition timing, an effective compression ratio, and an abnormal combustion area, which is obtained by an experiment conducted on compression self-ignition.
Figure 10:
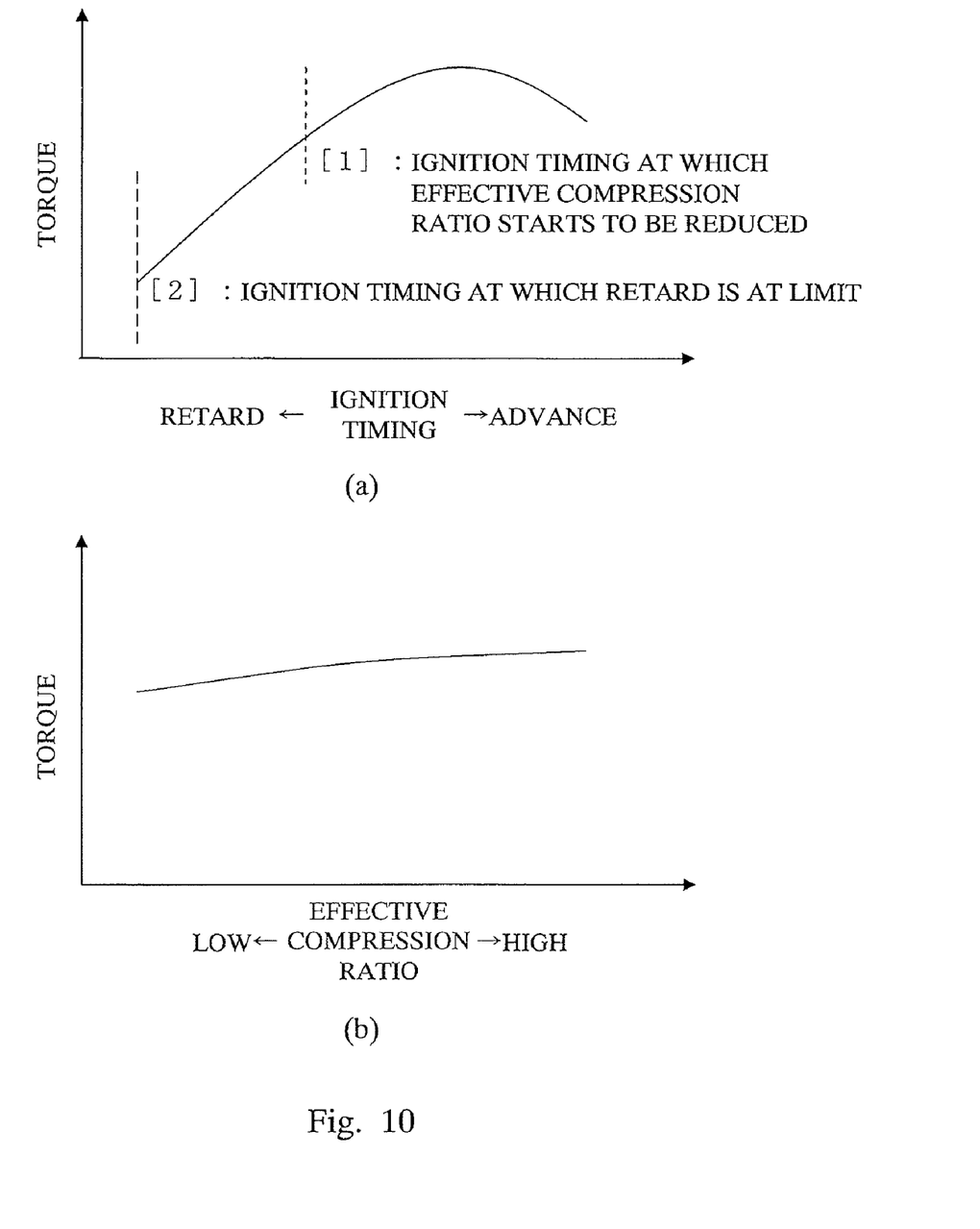
FIGS. 10A and 10B are explanatory views illustrating relations between the ignition timing and torque, and between the effective compression ratio and torque, respectively.

The above-mentioned problems are described further in detail with reference to FIGS. 9, 10A, and 10B. FIG. 9 is an explanatory view illustrating a relation between the ignition timing, the effective compression ratio, and an abnormal combustion area, which is obtained by an experiment conducted on the compression self-ignition. FIGS. 10A and 10B are explanatory views illustrating relations between the ignition timing and the torque, and between the effective compression ratio and the torque, respectively. The problem here is the case where a combustion state cannot get out of the abnormal combustion area even when the ignition timing is continuously retarded, as indicated by a dotted-line arrow (b') illustrated in FIG. 9. If the ignition timing is further continuously retarded in this case, the torque is greatly lowered, as illustrated in FIG. 10A.

Even with the conventional knock suppressing method of lowering the effective compression ratio after retarding the ignition timing to the most-retarded position in the engine with the high compression ratio, there is a problem of a remarkable reduction of the torque because the ignition timing is first retarded to the most-retarded position, as indicated by the dotted-line arrow (b') illustrated in FIG. 9 and as illustrated in FIGS. 10A and 10B. Moreover, as illustrated in FIG. 9, there is a possibility that the abnormal combustion occurring in the area is not due to the knock but due to the post-ignition or the pre-ignition. Therefore, there is another problem in that the abnormal combustion cannot be sufficiently suppressed only by reducing the effective compression ratio.

SUMMARY OF THE INVENTION

The present invention has been made in view of the problems described above, and has an object of providing a control apparatus for an internal combustion engine, which is capable of not only detecting abnormal combustion due to a knock but also early detecting abnormal ignition called pre-ignition or post-ignition to suppress the abnormal ignition while reducing a fluctuation in torque and a duration of abnormal vibrations.

A control apparatus for an internal combustion engine according to the present invention includes: operating state detection means for detecting an operating state of the internal combustion engine; variable valve mechanism control means for changing an operation state of a variable valve mechanism in accordance with the operating state to vary an effective compression ratio to obtain a desired effective compression ratio; ignition timing control means for controlling ignition timing in accordance with the operating state; first knock detection means for detecting occurrence of a first knock based on a detection signal by a knock sensor provided to a cylinder block; first knock suppression means for suppressing the first knock by retarding the ignition timing being set in accordance with the operating state when the first knock is detected by the first knock detection means; second knock detection means for judging that a second knock due to the effective compression ratio has occurred when the ignition timing in a case where the first knock is detected by the first knock detection means is on a retard side of a predetermined value; second knock suppression means for suppressing the second knock by calculating a first amount of reduction in the effective compression ratio to change the operation state of the variable valve mechanism so as to reduce the effective compression ratio based on a knock intensity of the second knock when it is judged by the second knock detection means that the second knock has occurred and by giving the calculated first amount of reduction in the effective compression ratio to the variable valve mechanism control means as a control instruction; first abnormal ignition detection means for judging that first abnormal ignition has occurred due to any one of pre-ignition and post-ignition when the knock intensity of the second knock is equal to or larger than a predetermined value; and first abnormal ignition suppression means for suppressing the first abnormal ignition by performing fuel control for the internal combustion engine when it is judged by the first abnormal ignition detection means that the first abnormal ignition has occurred.

According to the control apparatus for the internal combustion engine of the present invention, in the engine with the variable effective compression ratio, when an abnormal combustion area due to the knock or the abnormal ignition is expanded for the high effective compression ratio, the knock is detected to be quickly suppressed by retarding the ignition timing and reducing the effective compression ratio. In addition, the abnormal ignition is detected to be quickly suppressed by the fuel control. In this manner, not only the abnormal combustion due to the knock but also the abnormal ignition called the pre-ignition or the post-ignition is detected early. Therefore, the control apparatus for the internal combustion engine, which is capable of suppressing the abnormal ignition while reducing the fluctuation in torque and the duration of the abnormal vibrations, can be obtained.

DETAILED DESCRIPTION OF THE PREFERRED EMBODIMENT

Hereinafter, a preferred embodiment of a control apparatus for an internal combustion engine according to the present invention is described with reference to the drawings.

First Embodiment

Figure 1:
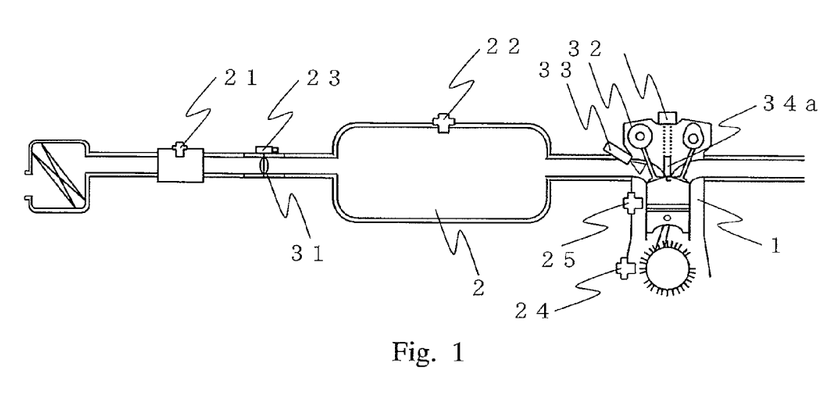
FIG. 1 is a schematic configuration diagram of an internal combustion engine according to a first embodiment of the present invention.
Figure 2:
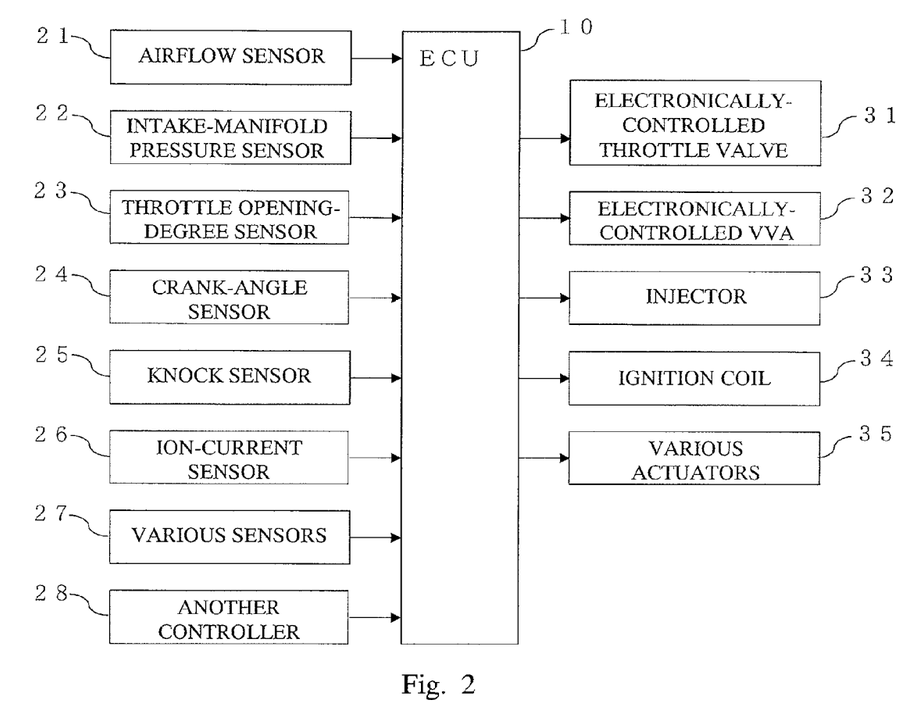
FIG. 2 is a block diagram of a control apparatus for the internal combustion engine according to the first embodiment of the present invention.

FIG. 1 is a schematic configuration diagram of the internal combustion engine in a first embodiment of the present invention. Further, FIG. 2 is a block diagram of a control apparatus for the internal combustion engine in the first embodiment of the present invention. Control of the internal combustion engine in this first embodiment is performed by an electronic control unit (hereinafter, referred to as "ECU") 10.

Input signals respectively from an airflow sensor 21, an intake-manifold pressure sensor 22, a throttle opening-degree sensor 23, a crank-angle sensor 24, a knock sensor 25, an ion-current sensor 26, other various sensors 27 and another controller 28 are connected to the ECU 10. Moreover, to the ECU 10, an electronically-controlled throttle valve 31, an electronically-controlled variable valve attenuation (VVA; variable valve mechanism) 32, an injector 33, an ignition coil 34, and various actuators are connected as targets to be controlled (see FIG. 2).

In FIG. 1, at the upstream of an inlet system of an engine 1, the electronically-controlled throttle valve 31 which is electronically controlled so as to adjust the amount of intake airflow is provided. Moreover, the throttle opening-degree sensor 23 is provided to measure the degree of opening of the electronically-controlled throttle valve 31.

Further, at the upstream of the electronically-controlled throttle valve 31, the airflow sensor 21 for measuring the amount of intake airflow is provided. At the downstream of the electronically-controlled throttle valve 31 on the engine 1 side, the intake-manifold pressure sensor 22 for measuring a pressure in a surge tank 2 is provided. As for the airflow sensor 21 and the intake-manifold pressure sensor 22, both or any one thereof may be provided.

In an inlet passage at the downstream of the surge tank 2, the injector 33 for injecting a fuel is provided. The injector 33 may also be provided so as to be able to directly inject the fuel into a cylinder of the engine 1.

Further, the electronically-controlled VVA 32 is provided to an intake valve of the engine 1 to enable variable control of at least one of opening/closing timing, an operating angle, and a lift amount of the intake valve. In this manner, an effective compression ratio of the engine 1 can be varied.

Moreover, the ignition coil 34, a spark plug 34a, the crank-angle sensor 24, and the knock sensor 25 are provided to the engine 1. Here, the ignition coil 34 and the spark plug 34a are for igniting an air-fuel mixture in the cylinder of the engine 1. The crank-angle sensor 24 is a sensor for detecting an edge of a plate, which is provided to a crank shaft for detecting a rotation speed of the engine or a crank angle thereof. Further, the knock sensor 25 is a sensor for detecting a vibration of the engine. Note that the ignition coil 34 includes the ion-current sensor 26 for detecting an ion current.

As illustrated in FIG. 2, the amount of intake airflow, which is measured by the airflow sensor 21, the intake-manifold pressure measured by the intake-manifold pressure sensor 22, the opening degree of the electronically-controlled throttle valve 31, which is measured by the throttle opening-degree sensor 23, a pulse in synchronization with the edge of the plate provided to the crank shaft, which is output from the crank-angle sensor 24, a vibration waveform of the engine, which is measured by the knock sensor 25, and the ion current detected by the ion-current sensor 26, are input to the ECU 10.

Moreover, even from the various sensors 27 other than the sensors described above, measured values are input to the ECU 10. Further, a signal from the another controller 28 (for example, a control system for automatic transmission control, brake control, traction control, and the like) is also input to the ECU 10.

The ion current detected by the ion-current sensor 26 included in the ignition coil 34 may be directly input to the ECU 10. Alternatively, after the ion current is input to another independent controller to be subjected to the processing, a position at which the ion current is generated or a position at which the ion current disappears, which corresponds to a final result of the processing, may be transmitted to the ECU 10 by communication through a controller area network (CAN) or the like.

The ECU 10 calculates a target throttle opening degree based on the degree of opening of an accelerator and an operating state of the engine to control the electronically-controlled throttle valve 31. Moreover, the ECU 10 controls the electronically-controlled VVA 32 so as to achieve a target effective compression ratio according to the operating state at that time. Moreover, the ECU 10 drives the injector 33 so as to achieve a target air-fuel ratio. Moreover, the ECU 10 energizes the ignition coil 34 so as to achieve target ignition timing. Further, the ECU 10 also calculates instruction values to various actuators other than those described above.

Figure 3:
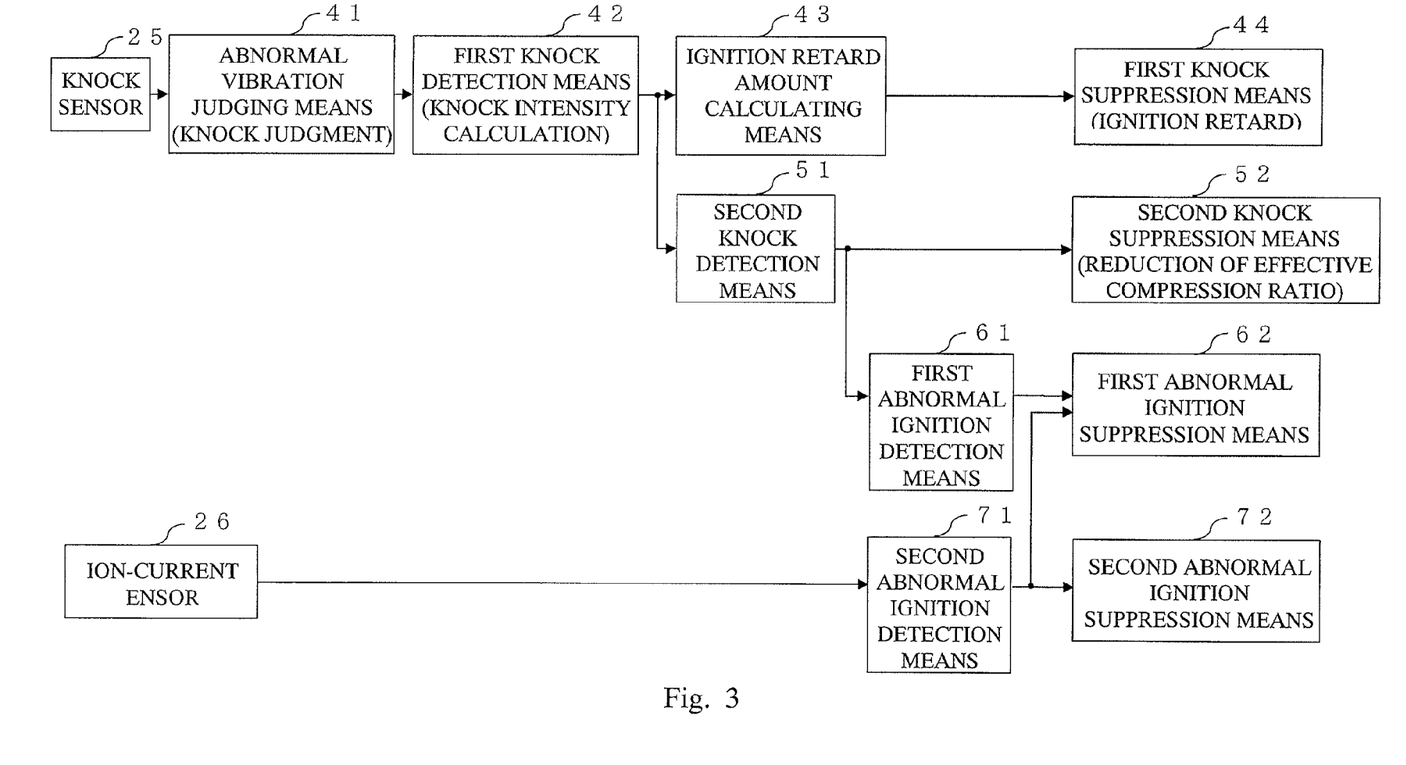
FIG. 3 is a block diagram illustrating an overall configuration of a method of suppressing a knock and abnormal ignition (pre-ignition and post-ignition) in the control apparatus for the internal combustion engine according to the first embodiment of the present invention.

Next, with reference to FIG. 3, a method of suppressing the knock and the abnormal ignition (pre-ignition and post-ignition) is described. FIG. 3 is a block diagram illustrating an overall configuration of a method of suppressing the knock and the abnormal ignition (pre-ignition and post-ignition) in the control apparatus for the internal combustion engine in the first embodiment of the present invention.

In the block diagram of FIG. 3, the knock sensor 25 and the ion-current sensor 26 are connected as sensor inputs. Then, various means for suppressing the knock and the abnormal ignition based on the inputs from the above-mentioned sensors are provided.

The means for suppressing the knock are roughly classified into a first knock suppression control section which performs ignition retard and a second knock suppression control section which reduces the effective compression ratio. As the first knock suppression control section which performs the ignition retard, abnormal vibration judging means 41, first knock detection means 42, ignition retard amount calculating means 43, and first knock suppression means 44 are provided. Moreover, as the second knock suppression control means which reduces the effective compression ratio, second knock detection means 51 and second knock suppression means 52 are further provided.

On the other hand, the means for suppressing the abnormal ignition are roughly classified into a first abnormal ignition suppression control section and a second abnormal ignition suppression control section. As the first abnormal ignition suppression control section, first abnormal ignition detection means 61 and first abnormal ignition suppression means 62 are provided. Moreover, as the second abnormal ignition suppression control section, second abnormal ignition detection means 71 and second abnormal ignition suppression means 72 are further provided.

First, the first knock suppression control section which performs the ignition retard is described. Judgment of the knock by the abnormal vibration judging means 41, a calculation of a knock intensity by the first knock detection means 42, and a calculation of an ignition retard amount by the ignition retard amount calculating means 43 are performed based on an output from the knock sensor 25. Then, based on the calculated ignition retard amount, the first knock suppression means 44 performs the ignition retard to suppress the knock.

Figure 4:
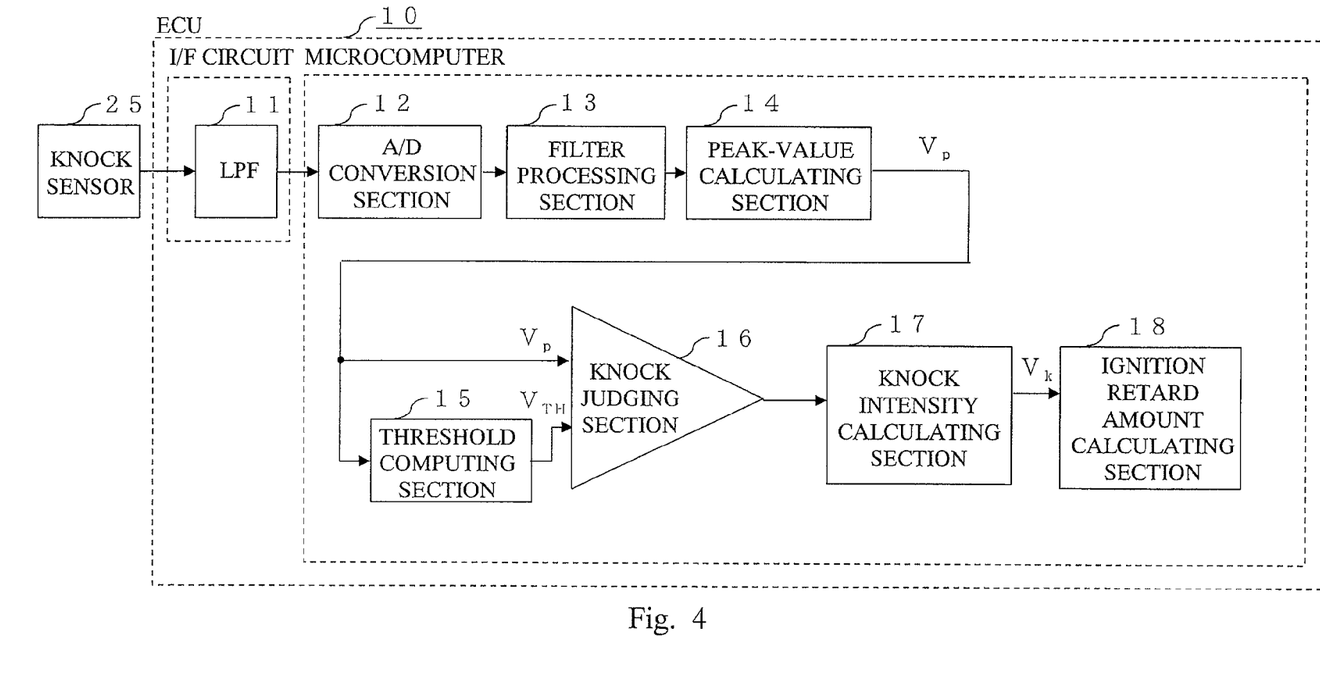
FIG. 4 is a block diagram illustrating an overall configuration of a first knock suppression control section in an ECU according to the first embodiment of the present invention.

Here, a specific method of first knock suppression control performed by the ECU 10 is described with reference to FIG. 4. FIG. 4 is a block diagram illustrating an overall configuration of the first knock suppression control section in the ECU 10 in the first embodiment of the present invention. As illustrated in FIG. 4, the first knock suppression control section in the ECU 10 includes an I/F circuit and a microcomputer.

More specifically, the I/F circuit of the first knock suppression control section includes a lowpass filter (LPF) 11 for removing a high-frequency component of the signal output of the knock sensor 25. On the other hand, the microcomputer of the first knock suppression control section includes an A/C conversion section 12, a filter processing section 13, a peak-value calculating section 14, a threshold computing section 15, a knock judging section 16, a knock intensity calculating section 17, and an ignition retard amount calculating section 18. Further, processings of the filter processing section 13, the peak-value calculating section 14, the threshold computing section 15, the knock judging section 16, the knock intensity calculating section 17, and the ignition retard amount calculating section 18 are performed in the microcomputer including a ROM area, a RAM area, and the like. The ROM area stores control programs and control constants, whereas the RAM area stores variables at the time of execution of the program.

Here, processings of the LPF 11, the A/C conversion section 12, the filter processing section 13, the peak-value calculating section 14, the threshold computing section 15, and the knock judging section 16 correspond to functions of the abnormal vibration judging means 41 illustrated in FIG. 3, which is referred to above. Moreover, processing of the knock intensity calculating means 17 corresponds to a function of the first knock detection means 42 illustrated in FIG. 3, which is referred to above. Further, processing of the ignition retard amount calculating section 18 corresponds to a function of the ignition retard amount calculating means 43 illustrated in FIG. 3, which is referred to above.

Next, a processing series relating to the first knock suppression control performed by the ECU 10 having the configuration illustrated in FIG. 4 is described. The LPF 11 is an I/F circuit for knock control, which removes the high-frequency component of the signal output of the knock sensor 25. Next, the A/D conversion section 12 executes A/D conversion on the signal, which has passed through the LPF 11, at constant time intervals (for example, every 10 μs, 20 μs, or the like). The A/D conversion section 12 may execute the A/D conversion constantly or only for a period in which the knock occurs (for example, a period from TDC to 50 deg. CA. ATDC; hereinafter, the period is referred to as a "knock detection window").

Next, the filter processing section 13 performs frequency analysis for extracting a frequency discrete component specific to the knock on the signal after the A/D conversion. As the filter processing, for example, filter processing with a digital bandpass filter may be used. Alternatively, spectral analysis of a target frequency may be performed by using short-time Fourier transform (STFT) processing.

The peak-value calculating section 14 calculates a peak value or an integral value based on the result of the filer processing of the waveform of the knock sensor in the above-mentioned knock detection window. In the following description of this first embodiment, the peak value is used as a value indicating a level of vibration. However, an index other than the peak value, for example, the integral value or the like may also be used as the value indicating the level of vibration.

Next, the threshold computing section 15 first performs smoothing processing on the peak value calculated by the peak-value calculating section 14 according to the following Formula (1) to perform averaging.

$$VBGL(n)=K1 \times VBGL(n-1)+(1-K1) \times VP(n) \tag{1}$$

Here, each reference symbol in the above-mentioned Formula (1) denotes the following.
VBGL(n): smoothed value;
VP(n): peak value; and
K1: averaging factor.

Subsequently, the threshold computing section 15 obtains a threshold value for judgment of the knock according to the following Formula (2).

$$VTH(n)=VBGL(n) \times Kth+Vofs \tag{2}$$

Here, each reference symbol in the above-mentioned Formula (2) denotes the following.
VTH(n): threshold value;
Kth: threshold factor; and
Vofs: threshold offset.

Alternatively, the threshold computing section 15 may calculate the threshold value according to the following Formula (3), supposing that a variation in the peak value is a normal distribution.

$$VTH(n)=VBGL(n)+Kth \times Vsigma(n) \tag{3}$$

Here, each reference symbol in the above-mentioned Formula (3) denotes the following.
Vsigma(n): standard deviation of peak value; and
Kth: threshold factor (for example, 3).

Next, the knock judging section 16 compares the peak value calculated by the peak-value calculating section 14 and the threshold value calculated by the threshold computing section 15 to judge whether or not the knock is occurring. Specifically, the knock judging section 16 judges that the knock is occurring when the peak value is larger than the threshold value.

Subsequently, the knock intensity calculating section 17 calculates a knock intensity corresponding to a signal according to an intensity of the knock, according to the following Formula (4).

$$VK(n)=\{VP(n)-VTH(n)\}/VTH(n) \tag{4}$$

Here, a reference symbol in the above-mentioned Formula (4) denotes the following.
VK(n): knock intensity (VK(n)=0 when knock does not occur).

Next, the ignition retard amount calculating section 18 calculates a retard amount according to the knock intensity for each ignition, according to the following Formula (5).

$$\Delta \theta R(n)=VK(n) \times Kg \tag{5}$$

Here, each reference symbol in the above-mentioned Formula (5) denotes the following.
ΔθR(n): retard amount for each ignition; and
Kg: retard amount reflecting factor.

After that, with the retard amount, ignition retard processing is performed by the first knock suppression means 44 illustrated in FIG. 3.

The above-mentioned processing corresponds to a general knock control method of retarding the ignition timing to suppress the knock when the knock is detected, which is conventionally used. In the case of the engine which is additionally provided with the electronically-controlled VVA (variable valve mechanism) 32 to have a variable effective compression ratio, if the compression ratio is increased, for example, as illustrated in FIG. 9 referred to above, there exist not only the area where the knock alone occurs but also areas where the post-ignition and/or the pre-ignition occur.

In the engine with a fixed effective compression ratio, the effective compression ratio is fixed to a sufficiently low compression ratio, with which the knock can be suppressed simply by retarding the ignition timing, as indicated by an arrow (a) illustrated in FIG. 9, so as to prevent the occurrence of the pre-ignition and the post-ignition. In the case of the engine with the effective compression ratio which can be increased, however, the engine sometimes operates at a slightly high effective compression ratio.

In such a case, if the knock is intended to be avoided by retarding the ignition timing as is conventionally performed, there is a problem in that a long time is required for the combustion state to get out of the abnormal combustion area to undesirably allow uncomfortable vibrations to continuously occur, in the abnormal combustion area due to the knock or the post-ignition, as indicated by the dotted-line arrow (b') illustrated in FIG. 9. Further, in addition to the case where the combustion state cannot get out of the abnormal combustion area, there is another problem in that the retard amount is increased to greatly lower the torque, as illustrated in FIG. 10A referred to above.

Therefore, in the above-mentioned cases, the effective compression ratio is used in combination with the ignition timing retard to allow the combustion state to get out of the abnormal combustion area, as indicated by an arrow (b) illustrated in FIG. 9. In this manner, the uncomfortable vibrations can be quickly suppressed. Moreover, as illustrated in FIGS. 10A and 10B, the amount of reduction in torque due to the reduced effective compression ratio is smaller than that due to the ignition timing retard. Therefore, the amount of reduction in torque can be reduced.

Therefore, in the method of suppressing the knock and the abnormal ignition (pre-ignition and post-ignition) in the control apparatus for the internal combustion engine according to this first embodiment, in addition of the implementation of the ignition timing retard, which has conventionally been performed, as the first knock suppression control, the effective compression ratio is reduced as the second knock suppression control. Specifically, as the second knock suppression control, the effective compression ratio is reduced by the second knock detection means 51 and the second knock suppression means 52 illustrated in FIG. 3 referred to above.

Figure 5:
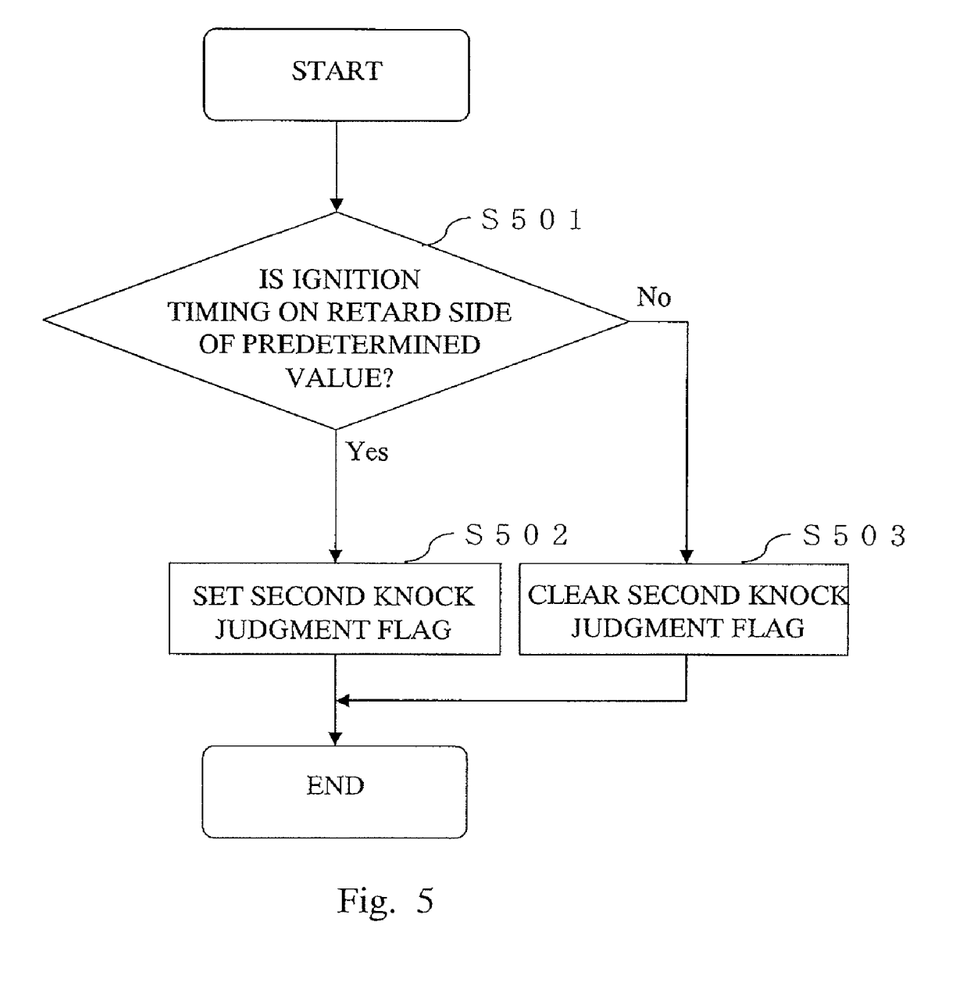
FIG. 5 is a flowchart illustrating a second knock detection method according to the first embodiment of the present invention.

When a first knock is detected by the first knock detection means 42, the second knock detection means 51 performs second knock judgment processing. Therefore, next, this judgment method is described based on a flowchart. FIG. 5 is a flowchart illustrating a second knock detection method in the first embodiment of the present invention. First, in Step S501, it is judged whether or not the ignition timing is on the retard side of a predetermined value.

If it is judged in Step S501 that the ignition timing is on the retard side of the predetermined value, the processing proceeds to Step S502 where a second knock judgment flag is set. Then, the processing is terminated. On the other hand, if it is judged in Step S501 that the ignition timing is not on the retard side of the predetermined value, the processing proceeds to Step S503 where the second knock judgment flag is cleared. Then, the processing is terminated.

Here, the predetermined value used for the judgment of the ignition timing is ignition timing at which the knock does not occur at a low compression ratio, and therefore, corresponds to ignition timing described as "[1] IGNITION TIMING AT WHICH EFFECTIVE COMPRESSION RATIO STARTS TO BE REDUCED" in FIGS. 9 and 10A referred to above. In the manner described above, the second knock judgment processing can be performed.

Next, if it is judged by the second knock detection means 51 that the second knock has occurred, the effective compression ratio is reduced by the second knock suppression means 52 illustrated in FIG. 3. Specifically, the second knock suppression means 52 calculates the amount of reduction in effective compression ratio according to the knock intensity, according to the following Formula (6). With the obtained amount of reduction in effective compression ratio, the target effective compression ratio is corrected.

$$\Delta \epsilon vvt(n) = VK(n) \times Kgvvt \qquad (6)$$

Here, each reference symbol in the above-mentioned Formula (6) denotes the following.

$\Delta \epsilon vvt(n)$: effective compression ratio reduction amount for each ignition; and Kgvvt: effective compression ratio reflecting factor.

Further, in the method of suppressing the knock and the abnormal ignition (pre-ignition and post-ignition) in the control apparatus for the internal combustion engine according to this first embodiment, when the abnormal ignition as indicated by an arrow (c) illustrated in FIG. 9 referred to above is detected, the suppression of the abnormal ignition is also performed. Specifically, first abnormal ignition suppression processing by the first abnormal ignition suppression control section (first abnormal ignition detection means 61 and first abnormal ignition suppression means 62) and second abnormal ignition suppression processing by the second abnormal ignition suppression control section (second abnormal ignition detection means 71 and second abnormal ignition suppression means 72) are performed.

As illustrated in FIG. 3 referred to above, the first abnormal ignition suppression processing is performed when the second knock is detected by the second knock detection means 51. On the other hand, the second abnormal ignition suppression processing is performed based on the position at which the ion current detected by the ion-current sensor 26 is generated or the position at which the ion current disappears.

Figure 6:
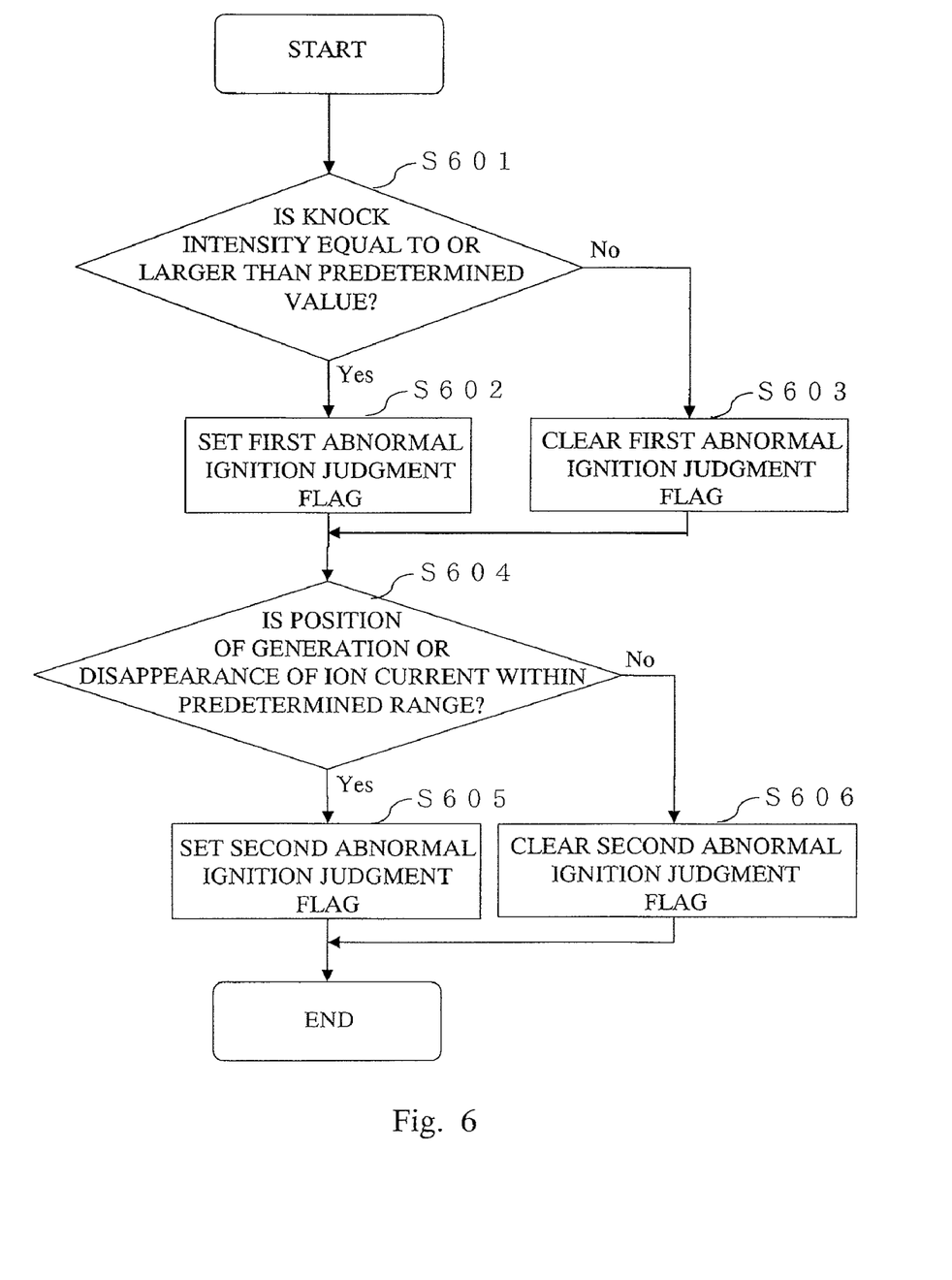
FIG. 6 is a flowchart illustrating processing of detecting the abnormal ignition with first abnormal ignition detection means and second abnormal ignition detection means according to the first embodiment of the present invention.

The above-mentioned abnormal ignition detection processing is described with reference to a flowchart. First, FIG. 6 is a flowchart illustrating the abnormal ignition detection processing performed by the first abnormal ignition detection means 61 and the second abnormal ignition detection means 71 in the first embodiment of the present invention. In Step S601, the first abnormal ignition detection means 61 judges whether or not the knock intensity of the second knock detected by the second knock detection means 51 is equal to or larger than a predetermined value. If the knock intensity is equal to or larger than the predetermined value, the processing proceeds to Step S602 where the first abnormal ignition detection means 61 sets a first abnormal ignition judgment flag.

Here, as the predetermined value for judgment of the knock intensity, an upper limit value of an allowable level of the general knock intensity is set. When the abnormal ignition occurs, larger vibrations than those due to the general knock occur. Therefore, the general knock and the abnormal ignition can be distinguished from each other. After that, the processing proceeds to Step S604.

On the other hand, if the condition is not satisfied in the previous Step S601, the processing proceeds to Step S603 where the first abnormal ignition detection means 61 clears the first abnormal ignition judgment flag. After that, the processing proceeds to Step S604.

Next, in Step S604, the second abnormal ignition detection means 71 judges based on the position at which the ion current is generated or the position at which the ion current disappears, whether or not second abnormal ignition has occurred.

Here, a method of detecting the position at which the ion current is generated or the position at which the ion current disappears is described. The ion-current sensor 26 is a sensor which detects ions generated at the time of combustion as a current by applying a predetermined bias voltage to the spark plug 34a, as described in, for example, JP 61-187558 A. Then, by the thus detected ion current, the combustion state can be detected.

Specifically, when there is no combustion, few ions are present. Therefore, an ion current value is approximately zero. However, as the combustion starts to be more intense to increase an in-cylinder temperature, the number of ions generated by the combustion or thermal ionization increases. Therefore, the ion current value increases. After that, when the combustion is terminated to lower the in-cylinder temperature, the ion current value also decreases. Before an exhaust stroke is performed, the ion current value becomes approximately zero.

For detecting the position at which the ion current is generated with the ion-current sensor 26, for example, the A/D conversion processing of the ion current value is performed for each predetermined crank angle in the microcomputer included in the ECU 10. Then, the crank angle at which the ion current value exceeds the detected threshold value is suitably obtained as the position at which the ion current is generated.

For detecting the position at which the ion current disappears, as in the case of the detection of the position at which the ion current is generated, the A/D conversion processing is performed. After the ion current value exceeds the detected threshold value, the crank angle at which the ion current value becomes less than a threshold value of disappearance is obtained as the position at which the ion current disappears. In this manner, the position at which the ion current is generated or disappears can be detected.

As a method of judging whether or not the abnormal ignition occurs based on the position at which the ion current is generated or the position at which the ion current disappears in Step S604, there are the following methods.

[First judgment method] A method of judging that the pre-ignition occurs based on the position at which the ion current is generated, which is earlier than the ignition timing.

[Second judgment method] A method of judging that the post-ignition occurs based on the position at which the ion current is generated or the position at which the ion current disappears, which is closer to the ignition timing than that in the normal combustion.

[Third judgment method] A method of judging that the abnormal ignition occurs if the position at which the ion current is generated or the position at which the ion current disappears is earlier than the ignition timing or within a predetermined period after the ignition.

Therefore, in Step S604, the second abnormal ignition detection means 71 can employ the above-mentioned third judgment method. In this case, when the position at which the ion current is generated or the position at which the ion current disappears is earlier than the ignition timing or within the predetermined period after the ignition, the processing proceeds to Step S605 where the second abnormal ignition detection means 71 sets a second abnormal ignition judgment flag. On the other hand, if not, the processing proceeds to Step S606 where the second abnormal ignition detection means 71 clears the second abnormal ignition judgment flag. In this manner, the abnormal ignition detection processing by each of the first abnormal ignition detection means 61 and the second abnormal ignition detection means 71, which are illustrated in FIG. 3 referred to above, can be performed.

Figure 7:
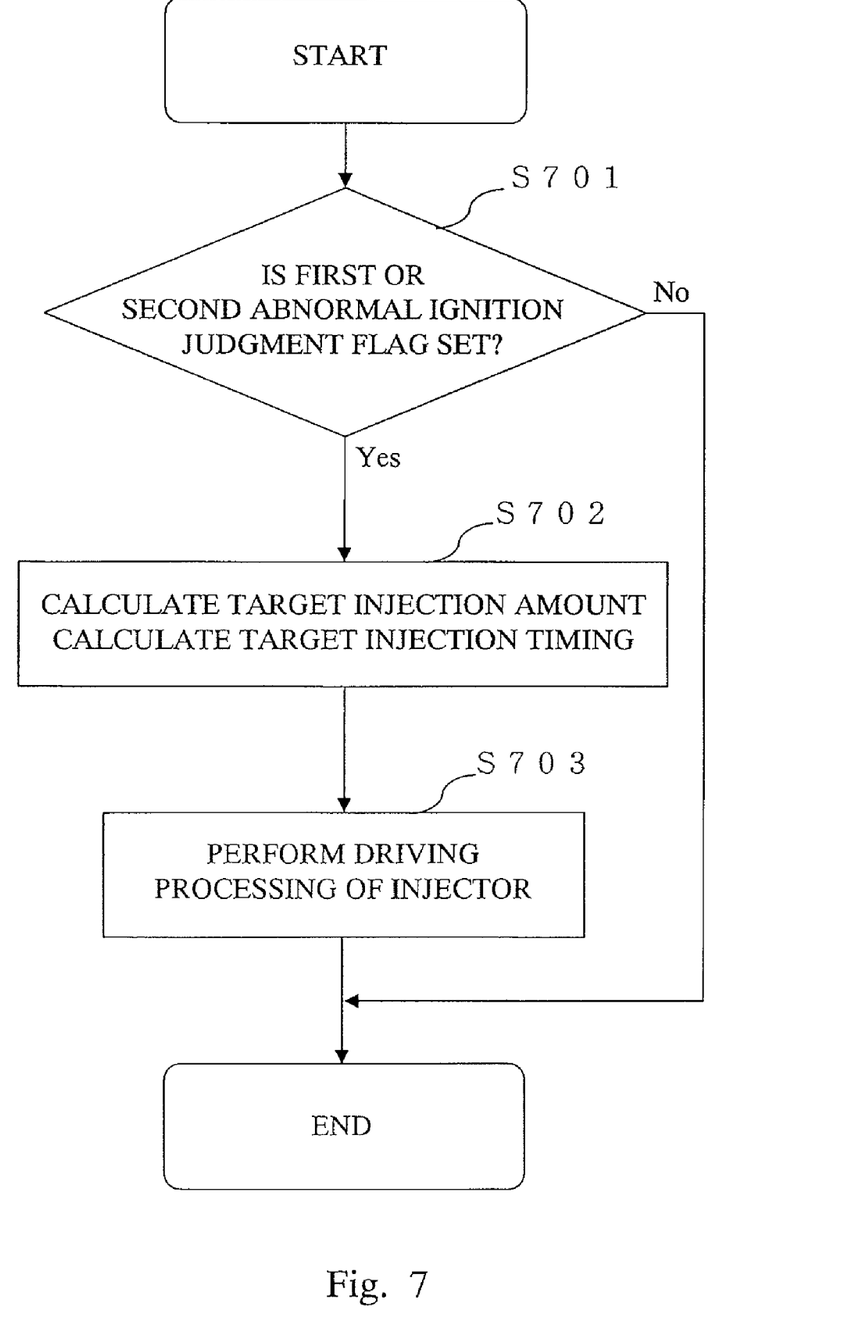
FIG. 7 is a flowchart illustrating a processing series of first abnormal ignition suppression control according to the first embodiment of the present invention.

As illustrated in FIG. 3 referred to above, if the abnormal ignition is detected by at least any one of the first abnormal ignition detection means 61 and the second abnormal ignition detection means 71, the first abnormal ignition suppression control is performed by the first abnormal ignition suppression means 62. The specific contents of the processing are described with reference to FIG. 7. FIG. 7 is a flowchart illustrating a processing series of the first abnormal ignition suppression control in the first embodiment of the present invention.

If the abnormal ignition occurs, it is effective to lower the in-cylinder temperature to suppress the abnormal ignition. Therefore, as a method of lowering the in-cylinder temperature, the following methods are effective.

[First method of lowering the in-cylinder temperature] The in-cylinder temperature during a compression stroke is lowered by reducing the effective compression ratio.

[Second method of lowering the in-cylinder temperature] The interior of the cylinder is cooled by increasing the amount of fuel or retarding fuel injection timing.

[Third method of lowering the in-cylinder temperature] The cylinder is forcibly scavenged by fuel cut during several strokes to lower the in-cylinder temperature.

Further, by using the above-mentioned methods in combination, the suppression control for the abnormal ignition can be performed.

Among the above-mentioned methods, the flowchart of FIG. 7 illustrates the case where the second method of lowering the in-cylinder temperature is used. In Step S701, the first abnormal ignition suppression means 62 confirms whether or not the first abnormal ignition judgment flag or the second abnormal ignition judgment flag is set. If none of the first abnormal ignition judgment flag and the second abnormal ignition judgment flag is set, the abnormal ignition has not occurred. Therefore, the processing is terminated. On the other hand, if any one of the first abnormal ignition judgment flag and the second abnormal ignition judgment flag is set, it is believed that the abnormal ignition has occurred. Therefore, the processing proceeds to Step S702.

Next, in Step S702, the first abnormal ignition suppression means 62 calculates a target injection amount or target injection timing to avoid the abnormal ignition so as to increase in amount or cut the fuel injection or to retard the fuel injection timing. Further, in Step S703, the first abnormal injection suppression means 62 drives the injector 33 so as to achieve the target injection amount or the target injection timing which is calculated in the previous Step S702.

Here, a set value of the target injection amount or the target injection timing in the case where the abnormal ignition occurs is prestored in a storage section as an appropriate parameter which defines the degree of variation in the injection amount or the injection timing, which is required to suppress the abnormal ignition. For example, if it is known in advance that the abnormal ignition can be suppressed by increasing the target injection amount for the normal combustion by 30%, the obtained value is prestored as the parameter in the storage section. As a result, when the abnormal ignition judgment flag is set, the first abnormal ignition suppression means 62 sets the injection amount, which is obtained by multiplying the target injection amount for the normal combustion by 1.3, as the target injection amount for avoiding the abnormal ignition.

Alternatively, as another example, if it is known in advance that the abnormal ignition can be suppressed by retarding the target injection timing for the normal combustion by 50 deg. CA, the obtained value is prestored in the storage section as the parameter. As a result, when the abnormal ignition judgment flag is set, the first abnormal ignition suppression means 62 can set the injection timing obtained by retarding the target injection timing for the normal combustion by 50 deg. CA as the target injection timing for avoiding the abnormal ignition. In this manner, the first abnormal ignition suppression means 62 can calculate the target injection amount or the target injection timing for avoiding the abnormal ignition.

When the first abnormal ignition is detected, the processing of reducing the effective compression ratio has already been performed by the second knock suppression means 52. Therefore, the second abnormal ignition suppression means 72 illustrated in FIG. 3 referred to above is provided so as to perform the processing of reducing the effective compression ratio even if only the second abnormal ignition has been detected by the second abnormal ignition detection means 71. Therefore, specific processing performed by the second abnormal ignition suppression means 72 is described with reference to FIG. 8.

Figure 8:
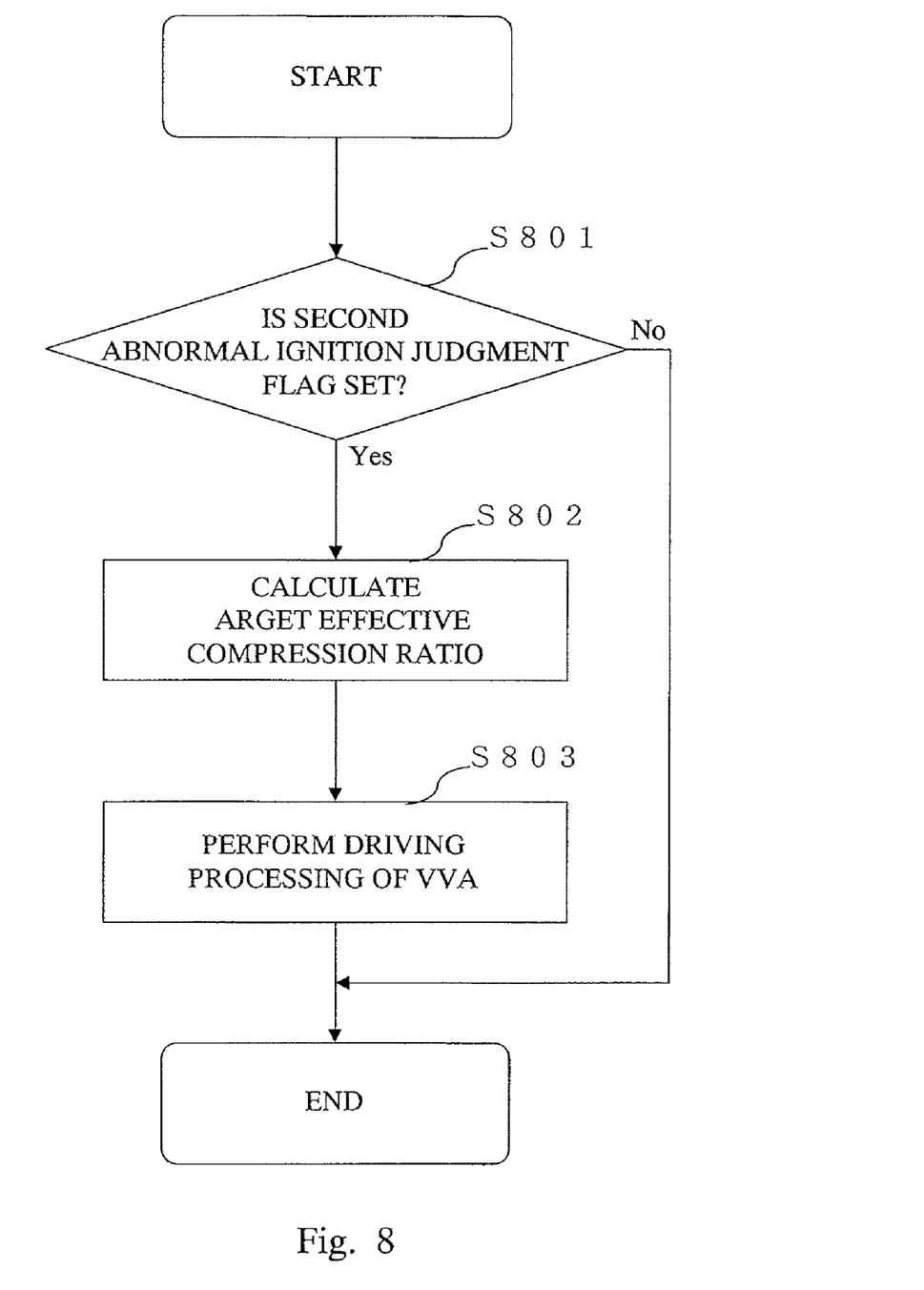
FIG. 8 is a flowchart illustrating a processing series of second abnormal ignition suppression control according to the first embodiment of the present invention.

FIG. 8 is a flowchart illustrating a processing series of the second abnormal ignition suppression control in the first embodiment of the present invention. First, in Step S801, the second abnormal ignition suppression means 72 confirms whether or not the second abnormal ignition judgment flag is set. If the second abnormal ignition judgment flag is set, the abnormal ignition has not occurred. Therefore, the processing is terminated. On the other hand, if the second abnormal ignition judgment flag is set, it is believed that the abnormal ignition has occurred. Therefore, the processing proceeds to Step S802.

Next, in Step S802, the second abnormal ignition suppression means 72 calculates the target effective compression ratio. Specifically, as expressed by the following Formula (7), the larger one of the amount of reduction in effective compression ratio by the second knock suppression means 52 and the amount of reduction in effective compression ratio when it is judged based on the ion current that the abnormal ignition has occurred is obtained as a final amount of reduction in effective compression ratio. With the obtained final amount of reduction in effective compression ratio, the target effective compression ratio is corrected.

$$\Delta \epsilon vvt(n) = \max\{VK(n) \times Kgvvt, \Delta \epsilon ion\} \quad (7)$$

In subsequent Step S803, the second abnormal ignition suppression means 72 drives the electronically-controlled VVA 32 so as to achieve the target effective compression ratio. In this manner, the second abnormal ignition suppression control is performed.

Here, $\Delta \epsilon ion$ is the amount of reduction in effective compression ratio when it is judged based on the ion current that the abnormal ignition has occurred. Then, the set value is prestored in the storage section as an appropriate parameter which defines the degree of change in effective compression ratio, which is required to suppress the abnormal ignition. For example, if it is known in advance that the abnormal ignition can be suppressed by reducing the effective compression ratio by 0.5, the obtained value is prestored as the parameter in the storage section. In this manner, the second abnormal ignition suppression means 72 can obtain 0.5 as $\Delta \epsilon ion$, therefore, can calculate the target effective compression ratio for avoiding the abnormal ignition according to the above-mentioned Formula (7).

As described above, according to the first embodiment, even if the abnormal combustion area due to the knock or the abnormal ignition (post-ignition or pre-ignition) is expanded for the high effective compression ratio in the engine with the variable effective compression ratio, the knock can be quickly suppressed by retarding the ignition timing and reducing the effective compression ratio in the case where the knock is detected, whereas the abnormal ignition can be quickly suppressed by the fuel control in the case where the abnormal ignition is detected.

Further, in addition to the abnormal ignition judged based on the detection of the knock, the abnormal ignition judged based on the ion current is also taken into consideration. Therefore, the detection accuracy for the abnormal ignition is further improved. As a result, the abnormal ignition can be further quickly suppressed by the reduction in effective compression ratio and the fuel control.

What is claimed is:

1. A control apparatus for an internal combustion engine, comprising:
   operating state detection means for detecting an operating state of the internal combustion engine;
   variable valve mechanism control means for changing an operation state of a variable valve mechanism in accordance with the operating state to vary an effective compression ratio to obtain a desired effective compression ratio;
   ignition timing control means for controlling ignition timing in accordance with the operating state;
   first knock detection means for detecting occurrence of a first knock based on a detection signal by a knock sensor provided to a cylinder block;
   first knock suppression means for suppressing the first knock by retarding the ignition timing being set in accordance with the operating state when the first knock is detected by the first knock detection means;
   second knock detection means for judging that a second knock due to the effective compression ratio has occurred when the ignition timing in a case where the first knock is detected by the first knock detection means is on a retard side of a predetermined value;
   second knock suppression means for suppressing the second knock by calculating a first amount of reduction in the effective compression ratio to change the operation state of the variable valve mechanism so as to reduce the effective compression ratio based on a knock intensity of the second knock when it is judged by the second knock detection means that the second knock has occurred, and by giving the calculated first amount of reduction in the effective compression ratio to the variable valve mechanism control means as a control instruction;
   first abnormal ignition detection means for judging that first abnormal ignition has occurred due to any one of pre-ignition and post-ignition when the knock intensity of the second knock is equal to or larger than a predetermined value; and
   first abnormal ignition suppression means for suppressing the first abnormal ignition by performing fuel control for the internal combustion engine when it is judged by the first abnormal ignition detection means that the first abnormal ignition has occurred.

2. A control apparatus for an internal combustion engine according to claim 1, further comprising:
   ion-current detection means for detecting an ion current flowing through a spark plug at a time of combustion occurring in the internal combustion engine; and
   second abnormal ignition detection means for judging that second abnormal ignition has occurred due to any one of the pre-ignition and the post-ignition when any one of timing of generation and timing of disappearance of the ion current detected by the ion-current detection means is within a predetermined range based on the ignition timing, wherein, when the abnormal ignition is detected by at least any one of the detection of the first abnormal ignition, performed by the first abnormal ignition detection means, and the detection of the second abnormal ignition, performed by the second abnormal ignition detection means, the first abnormal ignition suppression means performs the fuel control for the internal combustion engine to suppress the detected abnormal ignition.

3. A control apparatus for an internal combustion engine according to claim 2, further comprising second abnormal ignition suppression means for, when it is judged by the second abnormal ignition detection means that the second abnormal ignition has occurred, suppressing the second abnormal ignition by calculating a second amount of reduction in the effective compression ratio to change the operation state of the variable valve mechanism so as to reduce the effective compression ratio based on a magnitude of the ion current detected by the ion current detection means, and by giving the calculated second amount of reduction in the effective compression ratio to the variable valve mechanism control means as a control instruction when the calculated second amount of reduction in the effective compression ratio is larger than the first amount of reduction in the effective compression ratio.

4. A control apparatus for an internal combustion engine according to claim 1, wherein the first abnormal ignition suppression means suppresses the first abnormal ignition by increasing a fuel injection amount to enrich an air-fuel ratio when the first abnormal ignition is detected.

5. A control apparatus for an internal combustion engine according to claim 1, wherein the first abnormal ignition suppression means suppresses the first abnormal ignition by retarding a fuel injection timing when the first abnormal ignition is detected.

6. A control apparatus for an internal combustion engine according to claim 1, wherein the first abnormal ignition suppression means suppresses the first abnormal ignition by fuel cut when the first abnormal ignition is detected.

* * * * *

UNITED STATES PATENT AND TRADEMARK OFFICE
CERTIFICATE OF CORRECTION

PATENT NO. : 8,316,824 B2  
APPLICATION NO. : 12/906753  
DATED : November 27, 2012  
INVENTOR(S) : Hideki Hagari et al.

Page 1 of 1

It is certified that error appears in the above-identified patent and that said Letters Patent is hereby corrected as shown below:

Title page should read:

(73) Mazda Motor Corporation, Hiroshima (Japan) and <u>Mitsubishi Electric Corporation, Tokyo (Japan)</u>

Signed and Sealed this  
Fifth Day of February, 2013

Teresa Stanek Rea  
*Acting Director of the United States Patent and Trademark Office*